United States Patent [19]
Eckhardt

[11] Patent Number: 6,000,532
[45] Date of Patent: Dec. 14, 1999

[54] TEXTILE BELT

[75] Inventor: Gerhard Eckhardt, Schottwien, Austria

[73] Assignee: Huyck Austria GmbH, Gloggnitz, Austria

[21] Appl. No.: 09/037,615

[22] Filed: Mar. 10, 1998

[30] Foreign Application Priority Data

Mar. 11, 1997 [AT] Austria ....................................... 419/97

[51] Int. Cl.$^6$ .................................................. B65G 15/34
[52] U.S. Cl. .......................................................... 198/847
[58] Field of Search .............................. 198/844.2, 847; 24/33 A, 33 P, 33 K

[56] References Cited

U.S. PATENT DOCUMENTS

| | | | |
|---|---|---|---|
| 0,950,009 | 2/1910 | Slonecker | 24/33 K |
| 3,436,041 | 4/1969 | Haller | 24/33 P |
| 5,316,132 | 5/1994 | Muraoka et al. | 198/847 |
| 5,405,669 | 4/1995 | Lidar | 198/844.2 X |
| 5,514,438 | 5/1996 | Crook, Jr. | 24/33 P X |

Primary Examiner—James R. Bidwell
Attorney, Agent, or Firm—Thomas R. Vigil

[57] ABSTRACT

The textile belt (1) is made of a textile material and is used for a screen, conveyor belt or the like. The belt has attached to loops at end edges of belt ends, helical coils (4) which can be intertwined with adjacent helical coils and held together by means of an insertion wire, an insertion pin or the like which can be inserted into the intertwined helical coils. The helical coil (4) is divided at each end edge into at least three portions, namely two narrow edge portions (7) and a central portion (3), and each helical coil portion is connected to loops at the belt end edges independently of the other portions.

11 Claims, 1 Drawing Sheet

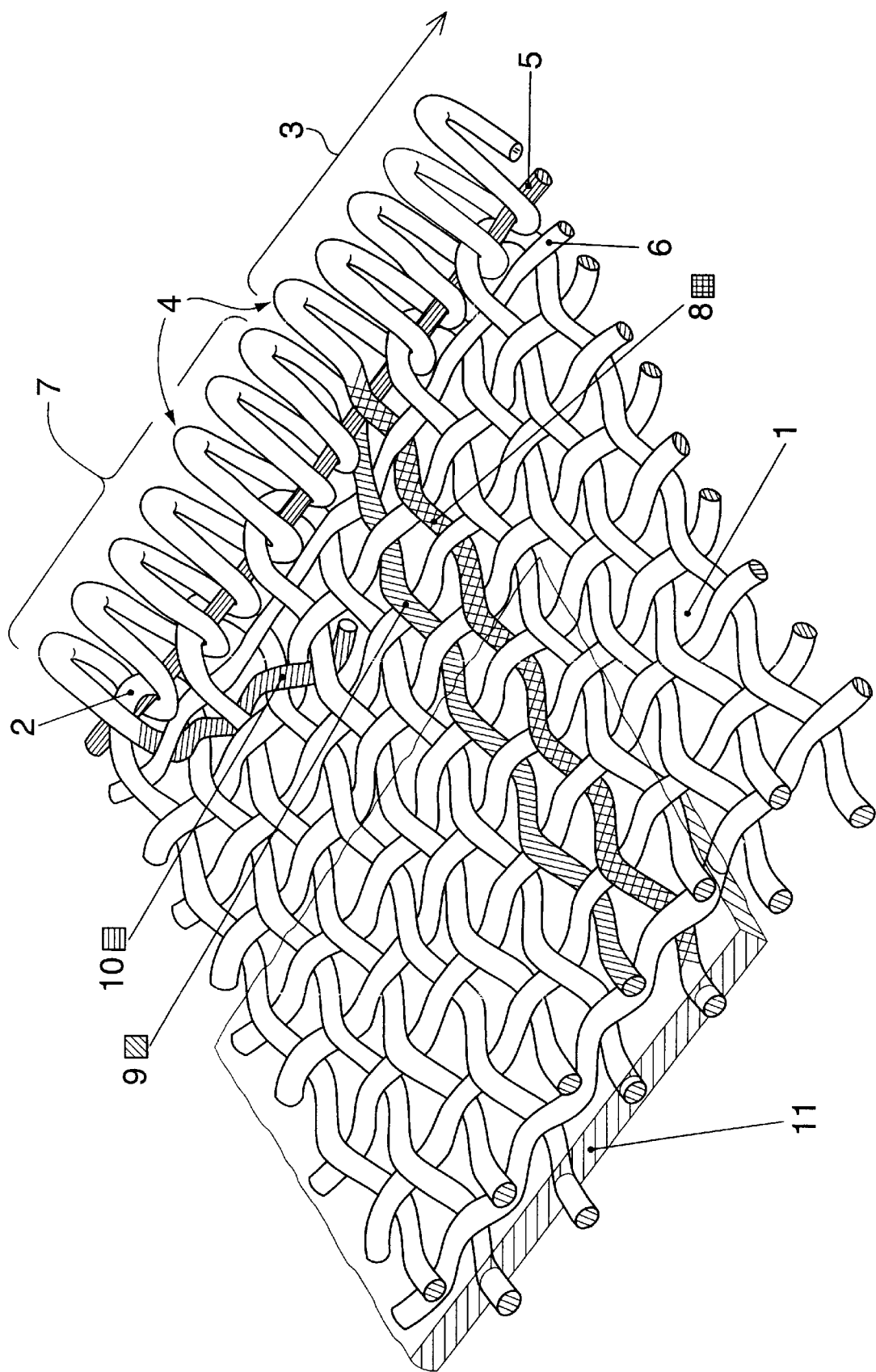

TEXTILE BELT

BACKGROUND OF THE INVENTION

1. Field of the Invention

The invention relates to a textile belt, such as a screen, conveyor belt or the like, wherein attached to the end edges of the belt ends are helical coils which can be intertwined with each other and held together by means of an insertion wire, insertion pin or the like which can be inserted.

Belts of this type are particularly used in de-watering techniques, for example for de-watering sludge, for de-watering pulp or for use in paper machines. The conventional widths of such belts range between 1.5 and approximately 8m.

2. Description of the Prior art

A belt of the present type is described for example in EP 0 564 436 A1 of the applicant and still further literature is mentioned in this document.

The use of helical coils on the end edges of the belt has proven to be particularly advantageous, since the helical coils attached to opposite end edges of the belt can be easily intertwined with each other and can be connected by means of an insertion wire. Other methods of attachment, e.g. loops, which protrude from the belt fabric and lie in parallel with each other, together with an insertion wire, are in practice by far not as convenient as helical coils. It has, however, been shown in practice that even if one helical coil is damaged, this coil can easily continue to tear and to become detached from the belt. The repair work which would be necessary in such a case is extremely time-consuming and requires that the relevant machine, on which the belt, e.g. the screen is used, be closed down.

SUMMARY OF THE INVENTION

The object of the invention is to reduce this disadvantage and to provide a belt which comprises a greater durability and a longer serviceable life between having to be replaced or repaired.

The object is achieved in accordance with the invention by the fact that the helical coil is divided at each end edge into at least three portions, namely two narrow edge portions and a central portion, wherein each portion is connected to the belt independently from the other portions.

The invention is based on the opinion that damage to the helical coils of the belt can occur primarily in the edge regions in which the belt cooperates, for example, with stops, width sensors, etc. As a consequence of the solution in accordance with the invention, in most cases of damage the wide central portion, which is independent of the narrow edge portions, remains undamaged, so that also the belt can mainly continue to run, without its connection to the end edges being called into question. In particular cases, it is possible to remove the damaged edge portion by trimming the belt, wherein the belt can then still always continue to run, since the width of the edge portion mostly lies only in the magnitude of 1% or less of the entire belt width. It is advantageous if the central portion of the helical coil is placed over its entire width into the textile material and/or in the end loops of the textile material of the belt, since as a consequence the central portion remains reliably intact even if a narrow portion becomes damaged.

The reliability of the connection is further increased, if the two ends of the helical coil of the central portion continue in one piece to become a securing portion which is spliced back, conforming with the weave in the longitudinal direction, into the textile material of the belt.

In many cases it can be expedient for the purpose of increasing the reliability, if the central portion 3 of the helical coil 4 is divided into part portions, wherein each part portion is connected to the belt independently of the other portions.

For the same reason, it is recommended that the inner ends of the helical coils of the two edge portions continue in one piece to become a securing portion which, conforming in the longitudinal direction with the weave, is spliced back into the textile material.

The reliability of the connection in the outer edge regions of the belt can be increased by the fact that the outer ends of the helical coils of the two edge portions continue in one piece to become a securing portion which is stitched back in the traverse direction in the end edge region.

In the event that the material of the helical coils and/or of the belt is thermoplastic, the securing portions can be thermo-fixed at least in the region of the end edges of the belt, whereby it is virtually impossible for these securing portions to become detached from the belt material.

A further protection of the connection of the belt end edges is produced if the belt is provided with a protective coating on one side or both sides in the narrow edge portions, wherein this protective coating can be applied as a thermoplastic or as a 2-component polymer onto the belt.

The width of the narrow edge portions is expediently between 10 and 30 mm, since this produces a sufficient level of reliability together with low manufacturing costs.

The invention togetherwith further advantages is further explained hereinunder with reference to an exemplified embodiment which is illustrated in the drawing.

BRIEF DESCRIPTION OF THE INVENTION

The single FIGURE of the drawing shows a plan view or bottom view of a part of a belt constructed in accordance with the invention, in its end edges and lateral region, with a partially removed helical coil.

DESCRIPTION OF THE PREFERRED EMBODIMENTS

The figure illustrates a section of a woven belt 1, e.g. a de-watering screen, which consists in this case of a monofil synthetic material. The actual width of such a belt amounts to for example between 1.5 m and 10 m and its length can be many times this width. The figure illustrates the section of the belt in a somewhat enlarged scale, so that only a part of the end edge, at the top in the drawing, is evident and a part of the lateral edge, on the left in the drawing.

A central portion 3 of a helical coil 4 is woven in the transverse direction into the loops 2 which protrude at the end edge out of the fabric of the belt 1 and in this case held by means of a special weft threat 5, over which a form-locking thread 6 is woven.

In the left of the drawing, this central portion 3 is adjoined by a narrow lateral portion 7 of the helical coil 4, which is likewise woven into the protruding loops.

In a similar manner, a helical coil is attached to the other end side (not illustrated) of the belt 1, so that the material can be connected to form a continuous belt by virtue of the fact that the helical coils are intertwined with each other at the end sides, winding adjacent to winding, and then an insertion wire, e.g. made from flat synthetic material, is pushed through both helical coils, namely through the channel thus formed. This is described both in EP 0 564 436 A1 mentioned in the introduction and in some of the documents mentioned in this patent.

Generally, a lateral portion, which corresponds to the narrow lateral portion 7, is also provided on the other lateral edge of the belt 1, such a lateral portion is however, omitted in the drawing for reasons of space. The two ends of the central portion 3 of the helical coil 4 are continued in one piece to become a securing portion 8 which is spliced back, conforming with the weave in the longitudinal direction, into the textile material, wherein owing to the width of the belt only the left securing portion 8 of the central portion 3 is illustrated in this case.

The same idea applies for the inner ends of the two edge portions 7 of the helical coil, wherein for reasons already mentioned only the narrow left lateral portion 7 is viewed in this case, in which the right end continues in one piece to become a securing portion 9 which is spliced back, conforming to the weave in the longitudinal direction, into the textile material, i.e. woven back therein.

The left end, as seen in the drawing, of the narrow lateral portion 7 of the helical coil continues in the illustrated exemplified embodiment in one piece to become a securing portion 10 which is stitched back in the end edge region into the woven material.

It is obvious that owing to the invention the narrow lateral portion 7 of the helical coil 4 can sustain damage without as a result affecting the central portion 3 of the helical coil 4, which central portion occupies the majority of the width, the reason for this being the complete independence of these portions. Any damage to the belt 1, in this case the helical coil 4, which serves to hold it together, occurs in most cases in the edge region of the belt 1, since during its rotation this often bumps against lateral boundaries, sometimes also against width sensors which are used for control purposes. Should the lateral portion 7 of the helical coil 4 become loosened, then this does not lead to an opening of the belt connection on its two end edges since the largest part, e.g. 98% of the width of the belt is still held together by means of the central portion 3 of the helical coils. If necessary, the belt 1 can even be trimmed around the width of the damaged narrow lateral portion 7, but this depends upon the respective application of the belt 1.

At the sides 7, the belt can comprise in the region of the narrow edge portions a protective coating 11, e.g. thermoplastic, which is generally applied on both sides to the textile web of the belt 1. With respect to the special loading, referred to, in the edge regions, the use of such a protective coating greatly increases the durability of the belt during its serviceable life. The type of belt material used, e.g. the textile weave, is inconsequential to the invention, as is the manner in which the helical coil 4 is connected to the end edge of the belt 1. It can, however, be mentioned in reference to examples that possible materials for the belt are polyamide, polyester, polypropylene and polyvinylidenefluoride and for the textile weave, insofar as the material is woven, linen cloth 1/1, twilled cotton fabric in all variants, Panama and Atlas, wherein all weaves are also possible in multi-layers.

I claim:

1. Textile belt (1) made of a textile material, for a screen, conveyor belt or the like, said belt having attached to loops at end edges of belt ends, helical coils (4) which can be intertwined with adjacent helical coils and held together by means of an insertion wire, an insertion pin or the like which can be inserted into the intertwined helical coils, characterized in that the helical coil (4) is divided at each end edge into at least three portions, namely two narrow edge portions (7) and a central portion (3), and each helical coil portion is connected to loops at the belt end edges independently of the other portions.

2. Belt according to claim 1 characterized in that the central portion (3) of the helical coil (4) is interwoven over its entire width into the textile material and/or positioned in the end loops of the textile material of the belt (1).

3. Belt according to claim 1, characterized in that the central portion (3) of the helical coil (4) is divided into part portions, wherein each part portion is connected to the belt independently of the other portions.

4. Belt according to any claim 1, characterized in that the central helical portion (3) has two ends and the two ends of the central portion (3) of the helical coil (4) or its part portions continue in one piece to become a securing portion (8) which is spliced back, conforming to the weave in the longitudinal direction, into the textile material of the belt (1).

5. Belt according to any claim 1, characterized in that inner ends of the two edge portions (7) of the helical coil continue in one piece to become a securing portion (9) which is spliced back, conforming to the weave in the longitudinal direction, into the textile material of the belt (1).

6. Belt according to any claims 1, characterized in that outer ends of the two edge portions (7) of the helical coils continue in one piece to become a securing portion (10) which is stitched back in the transverse direction in the end edge of the belt.

7. Belt according to claim 4, characterized in that the material of the helical coil (4) and/or of the belt (1) is thermoplastic and the securing portions (8, 9, 10) are thermofixed at least in the region of the end edges of the belt.

8. Belt according to claim 1, characterized in that the belt (1) is provided in the region of the narrow edge portions (7) on one side or on both sides with a protective coating (11).

9. Belt according to claim 8, characterized in that the protective coating (11) is applied as a thermoplast to the belt (1).

10. Belt according to claim 8, characterized in that the protective coating (11) is applied as a 2-component polymer to the belt (1).

11. Belt according to claim 1, characterized in that the width of the narrow edge portions (7) is generally between 10 and 30 mm.

* * * * *

UNITED STATES PATENT AND TRADEMARK OFFICE
CERTIFICATE OF CORRECTION

PATENT NO. : 6,000,532
DATED : December 14, 1999
INVENTOR(S) : Gerhard Eckhardt

It is certified that error appears in the above-identified patent and that said Letters Patent is hereby corrected as shown below:

Column 2,
Line 30, "together with" should be -- together with --;

Column 4,
Lines 22 and 27, delete "any"
Line 33, "any claims" should be -- claim --.

Signed and Sealed this

Seventh Day of May, 2002

Attest:

JAMES E. ROGAN
Attesting Officer    Director of the United States Patent and Trademark Office